(12) United States Patent
Guering

(10) Patent No.: US 7,584,823 B2
(45) Date of Patent: Sep. 8, 2009

(54) COMMUNICATING LADDER BETWEEN AN UPPER LEVEL AND A LOWER LEVEL OF AN AIRCRAFT, AND AN AIRCRAFT PROVIDED WITH SUCH A LADDER

(75) Inventor: Bernard Guering, Montrabe (FR)

(73) Assignee: Airbus France, Toulouse (FR)

( * ) Notice: Subject to any disclaimer, the term of this patent is extended or adjusted under 35 U.S.C. 154(b) by 796 days.

(21) Appl. No.: 11/053,597

(22) Filed: Feb. 8, 2005

(65) Prior Publication Data

US 2005/0247520 A1    Nov. 10, 2005

(30) Foreign Application Priority Data

Feb. 10, 2004    (FR) .................................. 04 50233

(51) Int. Cl.
*E04G 3/00*    (2006.01)
(52) U.S. Cl. ......................................... 182/97; 244/1 R
(58) Field of Classification Search .................. 182/97, 182/77, 129; 244/1 R, 118.5, 118.6, 129.6, 244/137.2
See application file for complete search history.

(56) References Cited

U.S. PATENT DOCUMENTS

| | | | | |
|---|---|---|---|---|
| 4,281,743 A | * | 8/1981 | Fuller ........................... | 182/46 |
| 4,515,241 A | * | 5/1985 | Gebelius ....................... | 182/96 |
| 6,386,318 B1 | * | 5/2002 | Smith ........................... | 182/97 |
| 6,581,876 B2 | * | 6/2003 | Cheung ...................... | 244/118.5 |
| 2005/0077107 A1 | * | 4/2005 | Libert et al. ................. | 182/119 |
| 2006/0000674 A1 | * | 1/2006 | McIntire et al. ............. | 182/129 |

FOREIGN PATENT DOCUMENTS

| DE | 42 23 320 C1 | | 7/1992 |
|---|---|---|---|
| FR | 2 496 570 | | 6/1982 |
| FR | 2865998 A1 | * | 8/2005 |
| GB | 416183 | | 9/1934 |
| JP | 11181982 | | 7/1999 |
| SU | 498213 | | 1/1976 |

* cited by examiner

*Primary Examiner*—Katherine Mitchell
*Assistant Examiner*—Candace L. Bradford
(74) *Attorney, Agent, or Firm*—Perman & Green, LLP

(57) ABSTRACT

A ladder is positioned between a first hatch of an upper level of an aircraft and a second hatch of a lower level of the aircraft. A bottom end of the ladder is mounted in rotation on a floor of the lower level. A top end of the ladder is unattached. The ladder can swivel between a first stable position and a second stable position. The top end of the ladder is provided with a safety device capable of the blocking an opening of the first hatch when the ladder is in the second stable position. For example, the safety device has a net. A first edge of the net is fixed to a first side of the first hatch. A second edge of the net is fixed to the top end of the ladder.

9 Claims, 2 Drawing Sheets

COMMUNICATING LADDER BETWEEN AN UPPER LEVEL AND A LOWER LEVEL OF AN AIRCRAFT, AND AN AIRCRAFT PROVIDED WITH SUCH A LADDER

CROSS-REFERENCE TO RELATED APPLICATIONS

This application claims priority from French Patent Application No. FR 04 50233 filed on Feb. 10, 2004.

BACKGROUND OF THE INVENTION

1. Field of the Invention

An object of the invention is a ladder for aircraft, capable of providing for communication between an upper level and a lower level of said aircraft. More specifically, an object of the invention is a ladder provided with a safety device and eliminating risks of people or objects falling from the upper level of the aircraft to the ground. The invention can be applied in the field of aeronautics. The invention finds application for example in the safety of maintenance personnel in aircraft.

It is an aim of the invention to guarantee the safety of the users of an aircraft having at least two levels, when a communicating hatch between a first level and a second level of the aircraft is open.

In aeronautics, there are aircraft having at least two levels or decks. A first level, or upper level, has for example a cockpit or flight deck. A second level, or lower level, has for example a hold.

In such an in aircraft, a lower hatch, made in the lower floor enables communication between the hold and the exterior of the aircraft. Thus, it is possible to store bulky objects in the hold. These objects are taken into the hold directly from the outside of the aircraft. Similarly, there is an upper hatch, made in an upper floor, enabling communication between the upper level and the lower level. To provide for maintenance, a user may, for example, descend from the cockpit or flight deck to the hold by means of a connecting ladder placed between the upper level and the lower level.

2. Description of the Prior Art

There is a prior art connecting ladder between the upper level and the lower level of an aircraft whose bottom end is mounted rotationally on the lower floor. A top end, opposite the bottom end, is unattached. Such a ladder makes it possible, when the lower hatch and the upper hatch are facing each other, to open a port to the hold from outside the aircraft despite the presence of the connecting ladder in said hold.

When a user wishes to reach the hold from the cockpit, the ladder is in a position of use. In the position of use, the top end of the ladder abuts a side of the upper hatch. In this position of use, the connecting ladder secures an access to the lower hatch. This means that the ladder extends diagonally from the upper hatch to the lower hatch. A user placed at the upper level of the aircraft and falling through the upper hatch cannot pass through the lower hatch, since access to the lower hatch is blocked by the ladder.

Conversely, when a user wishes to clear the access to the lower hatch, he makes the connecting ladder swivel until it abuts a side opposite the upper hatch. The ladder then extends in parallel to an axis of the upper hatch and lower hatch. In this position, known as the "maintenance position", the connecting ladder can no longer block access to the lower hatch.

Such a solution optimizes the amount of space occupied by the connecting ladder in the hold, for the ladder is fixed but can swivel between two different positions so as to enable a use of the ladder or clear a space in the hold.

However, if the hatches are at least partially facing each other, such a solution may prove to be dangerous. Indeed, when the ladder is in the maintenance position, the lower hatch may be open. If the upper hatch is also open, an object or person may fall from the upper floor to the ground in passing through the open lower hatch. Furthermore, an object falling from the upper level may strike a person situated at the lower level and injure him or her.

Besides, the cockpit, like the hold, is often encumbered. Furthermore, the floors of the aircraft are generally thick. Such a thickness is necessary especially to enable the loads to be supported. It is therefore not easy to detect the presence of the open upper hatch. This increases the risks of accidental falls.

The invention seeks to reduce the risks of accidental falls from the upper hatch made in the upper floor to the lower level of the aircraft or to the ground. In the invention, it is also sought to inform users of the aircraft, especially maintenance staff, of an opening of the first hatch.

To this end, the invention proposes a ladder provided with a fall-preventive device. The ladder of the invention is placed between a first hatch made in a floor of an upper level of the aircraft and a second hatch made in a floor of a lower level of said aircraft. The first and second hatches are at least partially in a position facing each other. The ladder has a lower end mounted rotationally on the floor of the lower level. The term "mounted rotationally" is understood to mean mounted on the floor of the lower level so as to permit a travel of the ladder from front to back and vice versa.

A top end of the ladder is unattached and capable of alternately abutting a first side and a second side of the first hatch, the first side being opposite the second side. Thus, the ladder may have two different stable positions depending on whether it abuts the first side or the second side of the upper hatch. The first stable position enables a user to go up and down between the lower level and the upper level of the aircraft. The second stable position makes it possible to clear the space in the hold, in reducing a space requirement of the ladder in said hold and opening an access to the lower hatch.

Furthermore, in order to prevent any untimely swiveling of the ladder when it is in the first or second stable position, said ladder may be provided with latching means. The latching means comprise for example a hook located at the top end of the ladder and a ring joined to the floor of the upper level. The hook can get hooked into the ring. Thus, when the user wishes to make the ladder swivel from the first stable position to the second stable position (or the reverse), he must first take the hook out of the ring.

The ladder of the invention is provided with the fall-preventive device at its top end. The fall-preventive device is activated when the ladder is in the second stable position. Indeed, it is in this position alone that a fall can take place from the upper level to the ground. The fall-preventive device of the invention prevents access to the upper hatch even when said upper hatch is open.

In one exemplary embodiment of the invention, the fall-preventive device comprises a net. The net is fixedly joined firstly to one side of the upper hatch and, secondly, to the top end of the ladder. The net is attached in such a way that it enables the net to have two states. A first state, or non-active state, is obtained when the ladder is in the first stable position. The net is then slack. The side of the net fixed to the side of the upper hatch is attached to the side of the net fixed to the ladder. A second state, or active state, is obtained when the ladder is in its second stable position. The net is then tautened on the entire aperture surface of the upper hatch. The side of the net fixed to the ladder is attached to the side of the upper hatch opposite the side of the hatch fixedly joined to the net.

Thus, when the ladder is in its second position, the net closes the opening in the upper hatch. A person who is situated at the upper level of the aircraft and does not see that the upper hatch is open is held by the net if, by mishap, he or she falls through this opening in the upper hatch.

In one particular exemplary embodiment of the invention, the fall-preventive device can be provided with a device giving information on the state of the fall-preventive device. Thus, persons situated at the upper level of the aircraft are informed of the opening of the upper hatch, and can avoid the discomfort of being caught in a fall by the fall-preventive device. Furthermore, such an approach augments the service life of the fall-preventive device, since said device is called into action only when objects fall.

SUMMARY OF THE INVENTION

An object of the invention therefore is a ladder positioned between a first hatch made in a floor of an upper level of an aircraft and a second hatch made in a floor of a lower level of said aircraft, the first hatch and the second hatch being at least partially face-to-face with each other, a bottom end of the ladder being mounted in rotation on the floor of the lower level and a top end of the ladder being unattached and capable of alternately abutting a first side and the second side opposite the first hatch so that the ladder has a first stable position and a second stable position, wherein the top end of the ladder is provided with a safety device capable of the blocking an opening of the first hatch when the ladder is in the second stable position.

In a particular exemplary embodiment of the invention, the safety device comprises a net, said net being provided with a first edge fixed to the first side of the first hatch, a second edge of the net being fixed to the top end of the ladder.

An object of the invention is also an aircraft having an upper level and a lower level, a floor of the upper level comprising a first hatch and a floor of the lower level comprising a second hatch, the first hatch and the second hatch being at least partially face-to-face with each other, wherein the aircraft comprises the ladder according to the invention.

The invention will be understood more clearly from the following description and the accompanying figures. These figures are given purely by way of an indication and in no way restrict the scope of the invention. Of these figures:

MORE DETAILED DESCRIPTION

Figure 1:
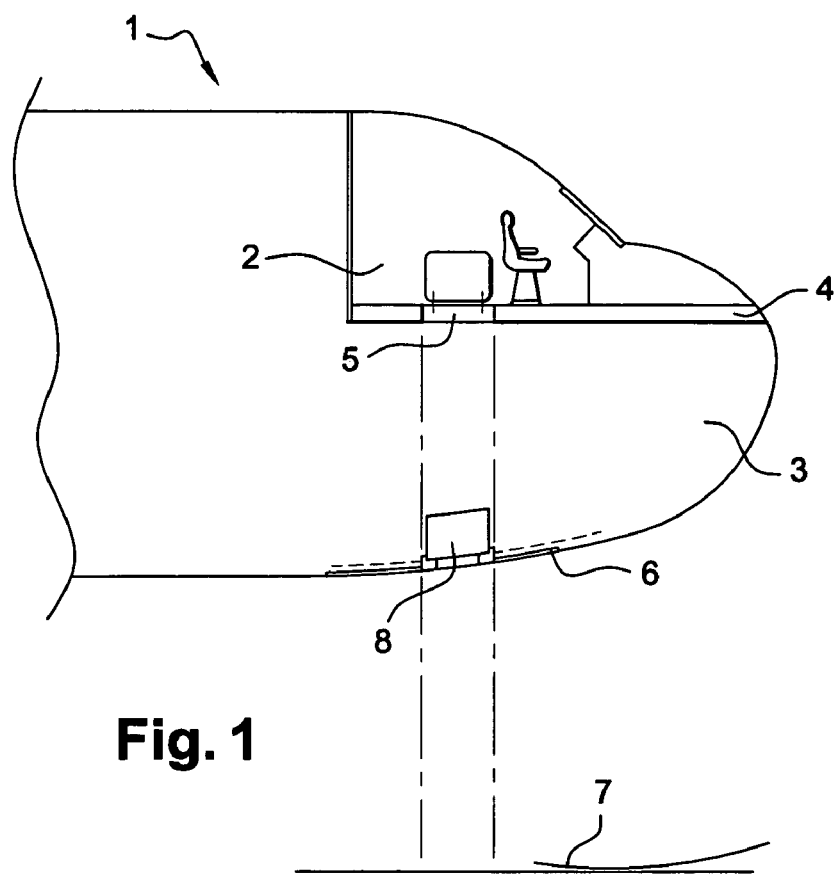
FIG. 1 is a view of a front part of an aircraft and of a first open hatch facing a second hatch that is also open, capable of being provided with a ladder of the invention.

FIG. 1 shows a front part of an aircraft 1. The front part is the part of the aircraft 1 having a cockpit. The aircraft 1 has two levels or decks 2 and 3. A first level 2, or upper level, contains the cockpit. A second level 3, or lower level, contains a hold. A floor 4, separating the upper level 2 from the lower level 3 has a first hatch 5. A floor 6, separating the lower level 3 from the ground 7 has a second hatch 8. The first hatch 5 and the second hatch 8 partially face each other. The aircraft 1 shown in FIG. 1 may be provided with a communicating ladder between the upper level 2 and the lower level 3 according to the invention.

Figure 2A:
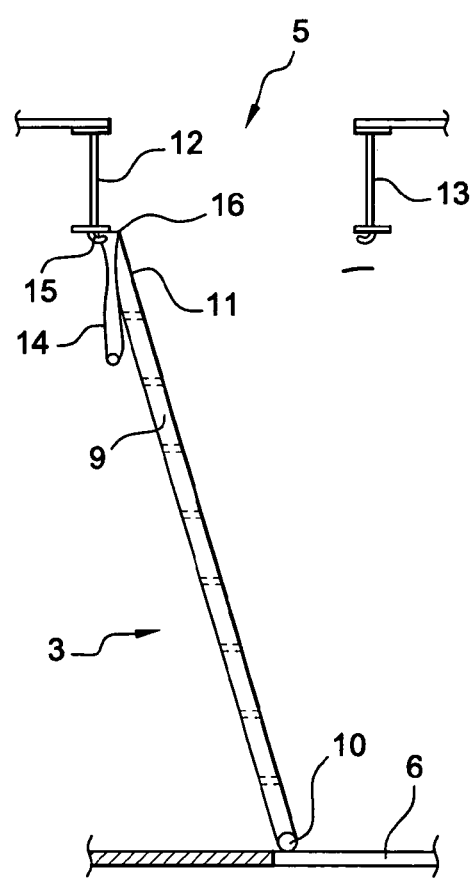
FIGS. 2A and 2B show a ladder provided with a safety device according to an exemplary embodiment of the invention, the ladder being respectively in a position of use (FIG. 2A) and a position of maintenance (FIG. 2B)
Figure 2B:
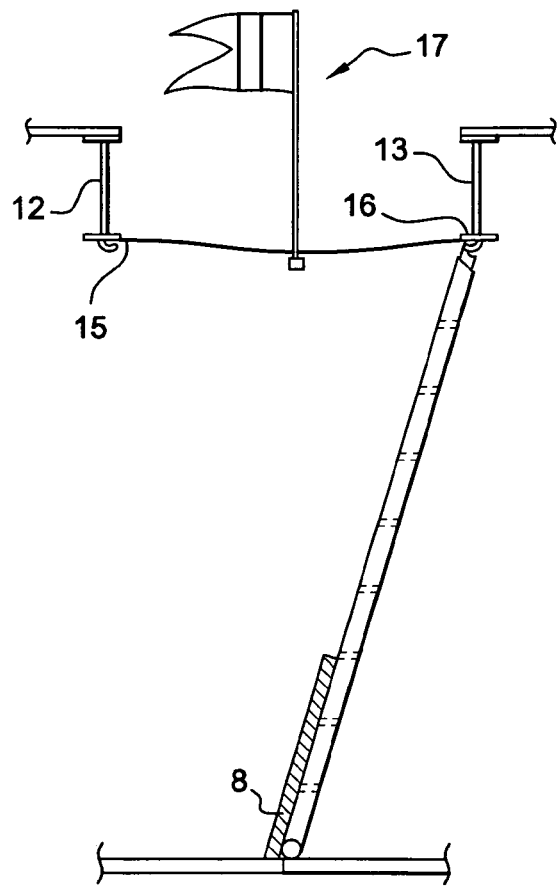

FIGS. 2A and 2B show a ladder 9 according to an exemplary embodiment of the invention. The ladder 9 enables communication between the upper level 2 of the aircraft 1 and the lower level 3.

A bottom end 10 of the ladder 9 is mounted in rotation on the floor 6 of the lower level 3. A top end 11 of the ladder is unattached and capable of abutting a first side 12 of the first hatch 5. The top end 11 of the ladder 9 is also capable of abutting a second side 13 of the top hatch 5.

In FIG. 2A, the ladder 9 is in a position of use. This means that the top end 11 of the ladder 9 abuts the first side 12 of the upper hatch 5, so as to be in a first stable position corresponding to the position of use in which the ladder 9 blocks access to the lower hatch 8.

The ladder 9 is provided with a safety device 14 formed by a net. A first edge 15 of the net 14 is fixed to the first side 12 of the first hatch 5. A second edge 16 of the net 14, opposite the first side 15, is fixed to the top end 11 of the ladder 9.

When the ladder 9 is in the position of use (FIG. 2A), the net 14 is slack since the top end 11 of the ladder 9, bearing the second edge 16 of the net 9, is supported on the first side 12 of the first hatch 5 bearing the first edge 15 of the net 9. The first edge 15 and second edge 0.16 of the net 9 are attached to each other.

When the ladder 9 is in a maintenance position (FIG. 2B), the net 14 is tautened so as to block the opening in the first hatch 5. Indeed, the second edge 16 of the net 14 is located at the position of the second edge 13 of the first hatch 5. In this position, the ladder 9 no longer hampers the opening of second hatch 8.

The net 14 can be fixed by any means to the side 12 of the hatch 5 and to the ladder 9. For example, the net 14 is provided with four straps (not shown). Each strap is fixed to one end of the edges 15 and 16 of the net 9. Each strap is then hooked to an attachment fitting, each attachment fitting being fixedly joined to the top end 11 of the ladder 9 or first side 12 of the upper hatch 5.

FIG. 2B also shows a visual warning device 17 of the invention. The visual warning device 17 is visible when the safety device 14 is activated. Thus, persons located at the upper level 2 of the aircraft 1 are informed of the fact that the first hatch 5 is open and that the ladder 9 is in the maintenance position.

Figure 3:
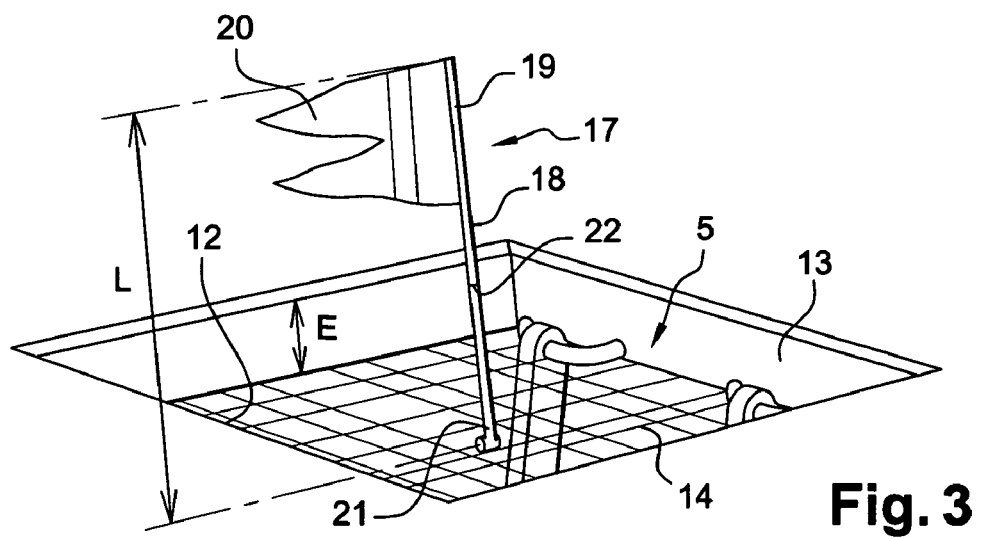
FIG. 3 shows a safety device provided with a visual warning device according to an exemplary embodiment of the invention.

FIG. 3 shows further details of the visual warning device 17. The visual warning device 17 has a mast 18. The mast 18 is parallel to an axis of the first hatch 5 when the net 14 blocks said hatch 5. A top end 19 of the mast 18 bears a flag 20. A length L of the mast 18 is strictly greater than a thickness E of the upper floor 4, so that the flag 20 goes beyond the upper hatch 5.

The mast 18 is hinged so that the total space required by the mast 18, when the net 14 is slack (FIG. 2A), can be contained in the net 14.

For example, the mast 18 is hinged at the position of its bottom end 21 so that the mast 18 swivels when the net 14 is slack, i.e. when it does not obstruct the hatch 5.

In another example of an embodiment of the invention, the mast 18 is a folding mast. Such a folding mast 18 can be used especially when the length L of the mast 18 is strictly greater than half the length of the net 14. Indeed, in this case, when the net 14 is slack, i.e. folded in two along with length, the top end 19 of the mast 18 which is not folded goes beyond the slack net 14. Thus, the mast 18 can be provided with a fold 22. The fold 22 enables the top end 19 of the mast 18 to be folded down towards the bottom end 21 of said mast 18. When the ladder 9 is made to swivel from its maintenance position, while the mast 18 is being set up at its position of use during which the mast is folded, the mast is folded manually into two at the position of the fold 22. The mast 18 is held in a folded position by a pocket formed by the slack net 14.

In order to hold the mast 18 parallel to an axis of the first hatch 5 when the net 14 is tautened, the bottom end 21 of the mast 18 is provided with vertical holding ballast. Thus, when the net 14 is tautened, the mast 18 gets unfolded and gets raised automatically until it reaches its position parallel to the axis of the hatch 5.

In order to optimize the efficiency of the visual warning device 17 of the invention, it is possible to use a bright-colored flag 20 such as an orange or red flag 20.

What is claimed is:

1. A ladder positioned between a first hatch made in a floor of an upper level of an aircraft and a second hatch made in a floor of a lower level of said aircraft, the first hatch and the second hatch being at least partially face-to-face with each other, a bottom end of the ladder being mounted in rotation on the floor of the lower level and a top end of the ladder being unattached and capable of alternately abutting a first side and a second side opposite the first hatch so that the ladder has a first stable position and a second stable position, wherein the top end of the ladder is provided with a safety device, the safety device being fixedly formed firstly to one side of the first hatch and secondly to the top end of the ladder in such a way that the safety device is activated when the ladder is in its second stable position and blocks an opening of the first hatch so as to avoid a fall from the upper level to the lower level, the safety device having a first edge fixed to the first side of the first hatch and a second edge of the net being fixed to the top end of the ladder.

2. A ladder according to claim 1, wherein the safety device comprises a net.

3. A ladder according to claim 2, wherein the net is fixed to the first side of the first hatch and the top end of the ladder by attachment fittings.

4. A ladder according to claim 1, provided with a visual warning device pertaining to the position of the ladder, the visual warning device being visible when the safety device blocks the opening of the first hatch.

5. A ladder according to claim 4, wherein the visual warning device comprises a mast, a top end of said mast being provided with a flag, a bottom end of the mast being fixedly joined to the net.

6. A ladder according to claim 5, wherein the bottom end is provided with a vertical holding ballast.

7. A ladder according to claim 5, wherein a length of the mast is greater than a thickness of the floor of the first hatch.

8. A ladder according to claim 5, wherein the mast is hinged.

9. An aircraft having an upper level and a lower level, a floor of the upper level comprising a first hatch and a floor of the lower level comprising a second hatch, the first hatch and the second hatch being at least partially face-to-face with each other, wherein the aircraft comprises the ladder according to claim 1.

* * * * *